(12) United States Patent
Hikita et al.

(10) Patent No.: US 8,288,708 B2
(45) Date of Patent: Oct. 16, 2012

(54) OPTICAL FILTER

(75) Inventors: Katurou Hikita, Hamamatsu (JP);
Fumihiko Shimomura, Hamamatsu (JP); Tomonori Tsunashima, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 438 days.

(21) Appl. No.: 12/665,823

(22) PCT Filed: Apr. 23, 2008

(86) PCT No.: PCT/JP2008/057854
§ 371 (c)(1),
(2), (4) Date: Feb. 4, 2010

(87) PCT Pub. No.: WO2009/001612
PCT Pub. Date: Dec. 31, 2008

(65) Prior Publication Data
US 2010/0171024 A1 Jul. 8, 2010

(30) Foreign Application Priority Data
Jun. 22, 2007 (JP) .................. P2007-165538

(51) Int. Cl.
*G01J 3/50* (2006.01)
*H04N 3/14* (2006.01)

(52) U.S. Cl. ........................... 250/226; 348/274

(58) Field of Classification Search .............. 250/226, 250/216; 356/416, 419; 348/274
See application file for complete search history.

(56) References Cited

U.S. PATENT DOCUMENTS

| 4,350,729 A | 9/1982 | Nakano et al. |
| 7,960,807 B2 * | 6/2011 | Lin et al. ............... 257/440 |

FOREIGN PATENT DOCUMENTS

| JP | 56-13479 | 2/1981 |
| JP | 57-151830 | 9/1982 |
| JP | 63-9827 | 1/1988 |
| JP | 5-322653 | 12/1993 |
| JP | 2001-208934 | 8/2001 |
| JP | 2005-156343 | 6/2005 |

* cited by examiner

*Primary Examiner* — Thanh Luu
(74) *Attorney, Agent, or Firm* — Drinker Biddle & Reath LLP

(57) ABSTRACT

An optical filter 2 is disposed on an image sensor 12 including a plurality of sensor pixels 12a which are aligned, and includes a elongated translucent substrate 4; a first optical filter layer 6 laminated on the translucent substrate 4, and a second optical filter layer 8 laminated on the first optical filter layer 6. The translucent substrate 4 includes a photodetecting part 4a which is long in the alignment direction X of the sensor pixels 12a and disposed on the image sensor 12; and a frame part 4b surrounding the photodetecting part 4a. The photodetecting part 4a includes a light transmitting region 41a on one side in the longitudinal direction of the photodetecting part 4a; a first filter region 42a adjacent to the light transmitting region 41a in the longitudinal direction of the photodetecting part 4a, and a second filter region 43a which is adjacent to the first filter region 42a in the longitudinal direction of the photodetecting part 4a and disposed on the side opposite to the light transmitting region 41a across the first filter region 42a. The first optical filter layer 6 covers the first and second filter regions 42a and 43a and the frame part 4b, and the second optical filter layer 8 covers the second filter region 43a and the frame part 4b.

7 Claims, 7 Drawing Sheets

OPTICAL FILTER

TECHNICAL FIELD

The present invention relates to an optical filter.

BACKGROUND ART

An optical filter has a function of transmitting only light in a specific wavelength band and blocking light in other wavelength bands (hereinafter, referred to as wavelength transmission characteristics), and is disposed, for example, on an image sensor (photodetector) which detects light in a diffraction grating spectral device. In this spectral device, light in a certain wavelength band output from a light source is made incident on a sample, and light transmitted through the sample of the incident light is spectroscopically divided by a diffraction grating. Only light in a wavelength band to be detected of the spectroscopically divided light is transmitted through the optical filter, and received and detected by the image sensor. On the other hand, light in a wavelength band other than the detection target, such as high-order diffracted light including second-order diffracted light and third-order diffracted light with wavelengths shorter than that of light of the detection target are blocked by the optical filter and are hardly detected by the image sensor.

As an example of the above-described optical filter, an optical filter is described in FIG. 3 of Patent Document 1 listed below, which is configured by forming bonding surfaces of a plurality of optical filters disposed immediately in front of the image sensor diagonally to the alignment direction of detection elements (sensor pixels) of the image sensor, and bonding adjacent optical filters to each other by an adhesive. The Patent Document 1 describes that, in a spectral device configured by using this optical filter, no step which makes inaccurate the spectral characteristics in acquired spectral data is formed, so that accurate quantitative and qualitative analysis is realized.

Patent Document 1: Japanese Laid-Open Patent Publication No. 2005-156343

DISCLOSURE OF THE INVENTION

Problems to be Solved by the Invention

A lamination type optical filter 70 shown in FIG. 7 is an example of an optical filter having a structure different from the optical filter shown in the Patent Document 1 while boundaries between the optical filters are made to diagonally cross the alignment direction of the sensor pixels as in the optical filter shown in the Patent Document 1. In the lamination type optical filter 70, a first optical filter layer 74 with wavelength transmission characteristics is laminated on a part of the surface of a translucent substrate 72. Further, on a part of the surface of the first optical filter layer 74, a second optical filter layer 76 different from the first optical filter layer 74 is laminated.

In this lamination type optical filter 70, the boundary 78 between the translucent substrate 72 and the first optical filter layer 74 and the boundary 80 between the first optical filter layer 74 and the second optical filter layer 76 diagonally cross the alignment direction of the sensor pixels, and the end portion 74a of the first optical filter layer 74 and the end portion 76a of the second optical filter layer 76 become acute. The acute end portions 74a and 76a are positioned at the end of the translucent substrate 72 and easily peel off due to an external force or aging degradation.

The present invention was made in view of this problem in the prior art, and an object thereof is to provide an optical filter which can restrain peeling-off of the optical filter layers.

Means for Solving the Problem

To solve the above-described problem, an optical filter of the present invention is an optical filter disposed on an image sensor including a plurality of sensor pixels aligned, and includes: a elongated translucent substrate; a first optical filter layer laminated on the translucent substrate; and a second optical filter layer laminated on the first optical filter layer, where the translucent substrate includes: a photodetecting part which is long in the alignment direction of the plurality of sensor pixels and positioned immediately above the image sensor; and a frame part surrounding the photodetecting part, the photodetecting part includes: a light transmitting region positioned on one side in the longitudinal direction of the photodetecting part; a first filter region adjacent to the light transmitting region in the longitudinal direction of the photodetecting part; and a second filter region which is adjacent to the first filter region in the longitudinal direction of the photodetecting part and positioned on the side opposite to the light transmitting region across the first filter region, the first optical filter layer is laminated so as to cover the first filter region, the second filter region, and the frame part, and the second optical filter layer is laminated so as to cover the second filter region and the frame part.

In the present invention, the first optical filter layer and the translucent substrate closely adhere to each other not only on the first filter region but also on the frame part and the second filter region, so that the area of the portion where the first optical filter layer and the translucent substrate closely adhere to each other becomes larger than conventionally. Further, on the first optical filter layer, the second optical filter layer is laminated from above on the frame part. As a result, the first optical filter layer is fixed to the translucent substrate more firmly than conventionally, so that the first optical filter layer can be restrained from peeling off from the translucent substrate due to an external force or aging degradation.

In the present invention, the second optical filter layer and the first optical filter layer closely adhere to each other not only on the second filter region but also on the frame part. As a result, the second optical filter layer is fixed to the first optical filter layer more firmly than conventionally, so that the second optical filter layer can be restrained from peeling off from the first optical filter layer due to an external force or aging degradation.

Further, in the present invention, the first optical filter layer and the second optical filter layer are also laminated in order on the frame part surrounding the photodetecting part, so that in contrast to the lamination type optical filter 70 shown in FIG. 7, the end portion of the first optical filter layer exposed inside the photodetecting part and the end portion of the second optical filter layer exposed inside the photodetecting part are not sharply pointed. As a result, even in the case where the boundary between the light transmitting region and the first filter region and the boundary between the first filter region and the second filter region are made to diagonally cross the alignment direction of the plurality of sensor pixels, the end portion of the first optical filter layer and the end portion of the second optical filter layer hardly peel off in comparison with the case of the lamination type optical filter 7 shown in FIG. 70.

It is allowed that the optical filter further includes a third optical filter layer laminated on the second optical filter layer, and the photodetecting part further includes a third filter region which is adjacent to the second filter region in the longitudinal direction of the photodetecting part and positioned on the side opposite to the first filter region across the second filter region, the first optical filter layer is laminated so as to cover the first filter region, the second filter region, the third filter region, and the frame part, the second optical filter layer is laminated so as to cover the second filter region, the third filter region, and the frame part, and the third optical filter layer is laminated so as to cover the third filter region and the frame part.

By further including the third optical filter layer and the third filter region, the optical filter can block light in a wavelength band which cannot be completely blocked by the first optical filter layer and the second optical filter layer.

The third optical filter layer and the second optical filter layer closely adhere to each other not only on the third filter region but also on the frame part. As a result, the third optical filter layer is firmly fixed to the second optical filter layer, so that the third optical filter layer can be restrained from peeling off from the second optical filter layer due to an external force or aging degradation.

Preferably, in the optical filter, the translucent substrate further includes an edge part surrounding the frame part. The edge part is preferably exposed.

Even when an external force is applied to the optical filter, the photodetecting part and the frame part can be protected from the external force by the edge part. Further, at the edge part which is comparatively easily chipped on the translucent substrate, the optical filter layers are not laminated but the edge part is exposed, and accordingly, the possibility that chipping occurring at the edge part causes the optical filter layers to peel off is reduced.

In the optical filter, preferably, the boundary between the light transmitting region and the first filter region and the boundary between the first filter region and the second filter region diagonally cross the alignment direction of the plurality of sensor pixels immediately above the image sensor. Preferably, the boundary between the second filter region and the third filter region are made to diagonally cross the alignment direction of the plurality of sensor pixels immediately above the image sensor.

When the boundary between the light transmitting region and the first filter region, the boundary between the first filter region and the second filter region, and the boundary between the second filter region and the third filter region are made to diagonally cross the alignment direction of the plurality of sensor pixels, each of the boundaries crosses immediately above two or more sensor pixels. As a result, even when the light transmittance decreases at the boundaries of the filter regions of the optical filter, a decrease in output per sensor pixel can be reduced in comparison with the case where each of the boundaries crosses immediately above a single sensor pixel.

In the optical filter described above, the translucent substrate may be exposed in the light transmitting region.

Effect of the Invention

According to the present invention, optical filter layers in the optical filter can be restrained from peeling off.

DESCRIPTION OF THE REFERENCE NUMERALS

Figure 1:
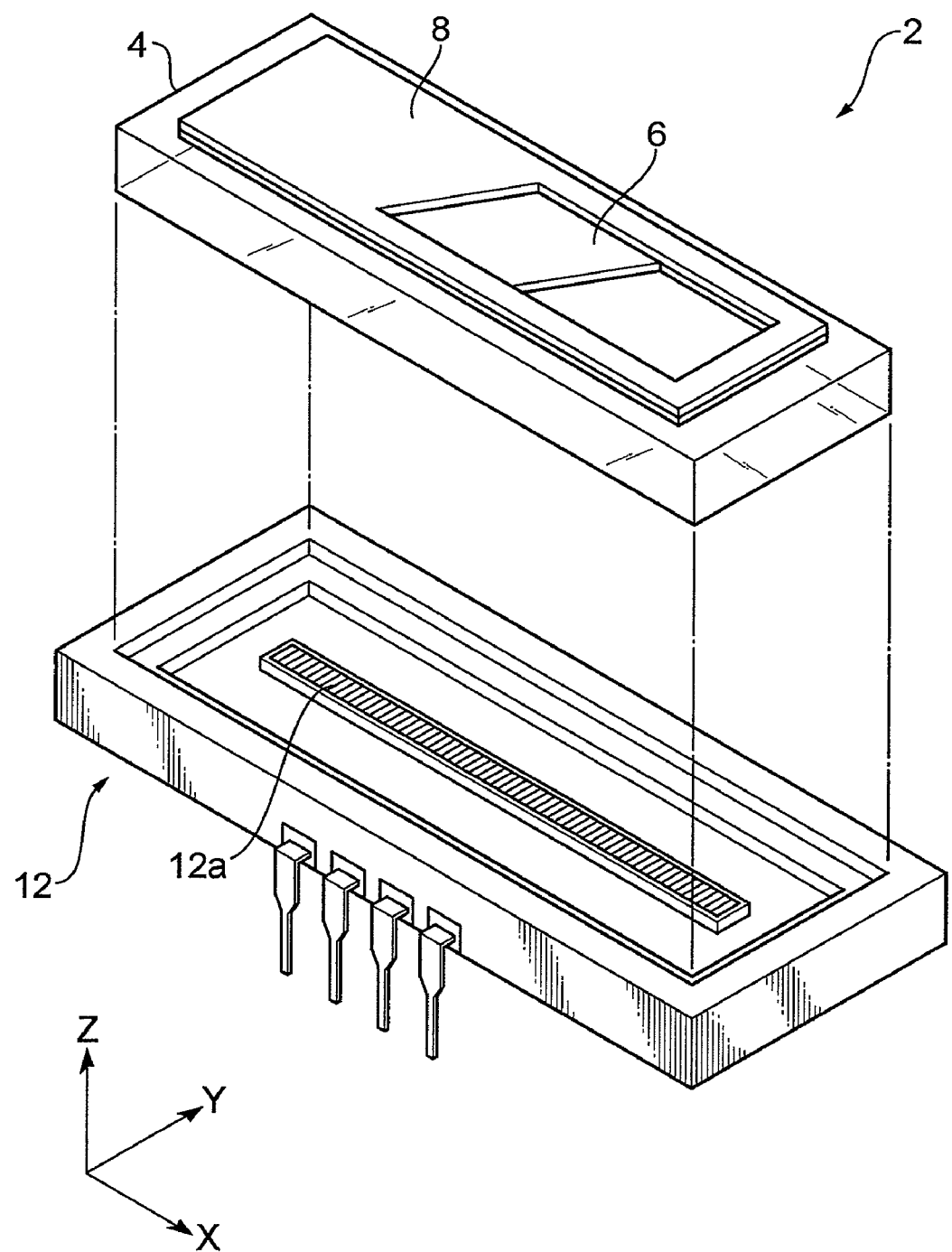
FIG. 1 is a schematic exploded perspective view of an image sensor including an optical filter of an embodiment of the present invention.

2: Optical filter, 4: Translucent substrate, 4a: Photodetecting part, 4b: Frame part, 4c: Edge part, 6: First optical filter layer, 8: Second optical filter layer, 10: Third optical filter layer, 12: Image sensor, 12a: Sensor pixel, 41a: Light transmitting region, 42a: First filter region, 43a: Second filter region, 44a: Third filter region, 45: Boundary between light transmitting region and first filter region, 46: Boundary between first filter region and second filter region, 47: Boundary between second filter region and third filter region

BEST MODES FOR CARRYING OUT THE INVENTION

Hereinafter, a preferred embodiment of the present invention will be described with reference to the accompanying drawings. However, the present invention is not limited to the following embodiment. In the description of the drawings, elements identical to or equivalent to each other will be attached with the same reference numerals, and overlapping description will be omitted.

Figure 2:
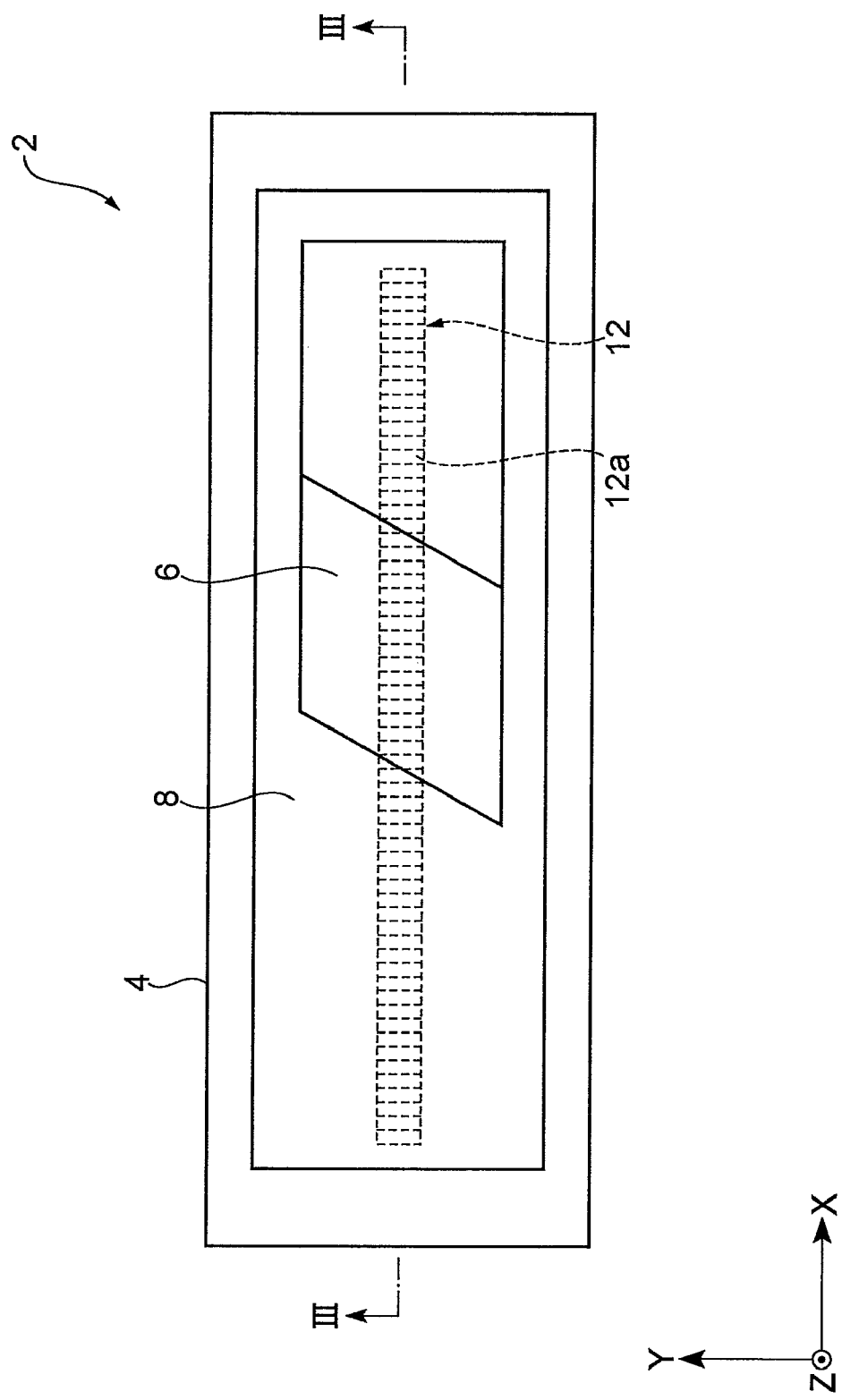
FIG. 2 is a schematic view of the optical filter shown in FIG. 1, as viewed from the photodetecting part side.
Figure 3:
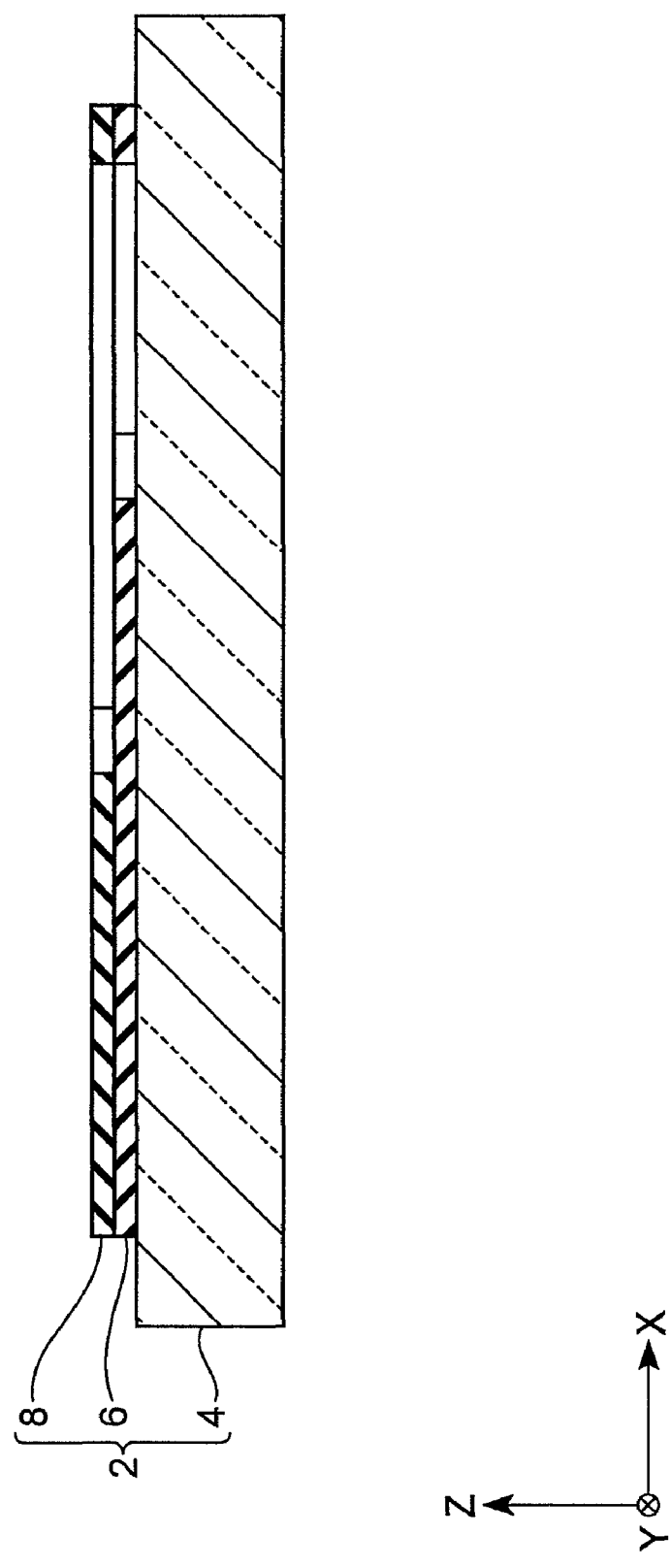
FIG. 3 is a schematic sectional view along the III-III line of the optical filter of FIG. 2.

The optical filter 2 includes, as shown in FIG. 1 to FIG. 3, a elongated translucent substrate 4, a first optical filter layer 6 laminated on the translucent substrate. 4, and a second optical filter layer 8 laminated on the first optical filter layer 6. This optical filter 2 is disposed on an image sensor 12 which includes a plurality of sensor pixels 12a aligned in the longitudinal direction X of the translucent substrate 4. In FIG. 1, for convenience of description, the optical filter 2 is spaced from the image sensor 12, however, in actuality, the optical filter 2 is fitted into a recess provided on the image sensor 12.

As a material for forming the translucent substrate 4, a glass plate is normally used. As dimensions of the translucent substrate 4, normally, the length in the longitudinal direction X is approximately 20 to 40 millimeters, the length in the shorter side direction is approximately 4 to 8 millimeters, and the thickness is approximately 0.5 to 3 millimeters.

The first optical filter layer 6 and the second optical filter layer 8 are dielectric multilayer films having wavelength transmission characteristics different from each other. Materials of the dielectric multilayer films may be properly selected according to the wavelength bands of light to be transmitted through the first optical filter layer 6 and the second optical filter layer 8, and low-refractive index materials such as $MgF_2$ and $SiO_2$, middle-refractive index materials such as $Al_2O_3$, and high-refractive index materials such as $ZrO_2$ and $TiO_2$ are used. The layer thickness in the lamination direction Z of the first optical filter layer 6 is normally 0.1 to 1 micrometer. The layer thickness in the lamination direction Z of the second optical filter layer 8 is normally 0.1 to 1 micrometer.

As the image sensor 12, a CMOS sensor, etc., including photodiodes as sensor pixels 12a is used. As dimensions of the sensor pixels 12a, for example, the pitch is not more than 50 micrometers and the pixel height (length in the longitudinal direction Y of the sensor pixels 12a) is approximately 0.5 millimeters, and the number of sensor pixels 12a to be aligned is, for example, 128 to 1024.

Figure 4:
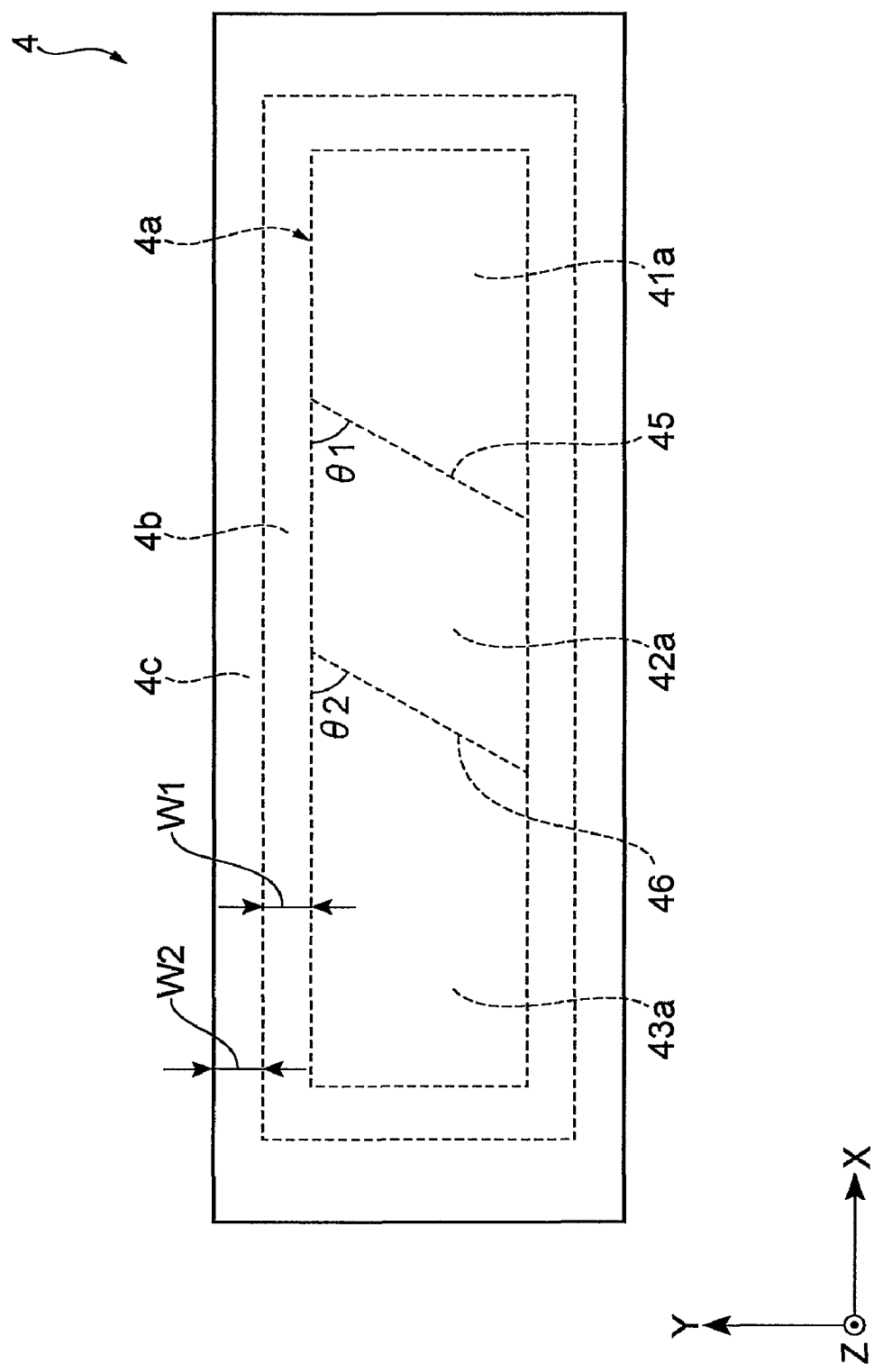
FIG. 4 is a schematic view of a translucent substrate of the optical filter of an embodiment of the present invention, as viewed from the photodetecting part side.

The translucent substrate 4 includes, as shown in FIG. 4, a rectangular photodetecting part 4a and a frame part 4b surrounding the photodetecting part 4a. Incident light is made incident on the optical filter 2 from the photodetecting part 4a side of the translucent substrate 4, and light in a wavelength band of a part of the incident light is blocked, and light in other wavelength bands is transmitted to the side of the image sensor 12. The width W1 of the frame part 4b is normally approximately 1 to 3 millimeters.

Preferably, the translucent substrate 4 further includes an edge part 4c surrounding the frame part 4b. Preferably, the edge part 4c is not covered by the optical filter layers but is exposed. The width W2 of the edge part 4c is normally approximately 0.05 to 1 millimeter.

The photodetecting part 4a includes a light transmitting region 41a, a first filter region 42a, and a second filter region 43a. The light transmitting region 41a is positioned on one side in the longitudinal direction of the photodetecting part 4a. The first filter region 42a is adjacent to the light transmitting region 41a in the longitudinal direction of the photodetecting part 4a. The second filter region 43a is adjacent to the first filter region 42a in the longitudinal direction of the photodetecting part 4a, and positioned on the side opposite to the light transmitting region 41a across the first filter region 42a. This photodetecting part 4a is long in the alignment direction X of the plurality of sensor pixels 12a, and positioned immediately above the image sensor 12. The areas of the light transmitting region 41a, the first filter region 42a, and the second filter region 43a are substantially equal to each other.

Preferably, the boundary 45 between the light transmitting region 41a and the first filter region 42a and the boundary 46 between the first filter region 42a and the second filter region 43a diagonally cross the alignment direction X of the plurality of sensor pixels 12a immediately above the image sensor 12. The angles θ1 and θ2 formed between the boundaries 45 and 46 and the alignment direction X of the sensor pixels 12a are normally approximately 70 degrees. The boundaries 45 and 46 are normally parallel to each other.

The first optical filter layer 6 is laminated so as to cover the first filter region 42a, the second filter region 43a, and the frame part 4b. The second optical filter layer 8 is laminated so as to cover the second filter region 43a and the frame part 4b. The light transmitting region 41a may not be covered by the optical filter layers but may be exposed, or may be covered by the optical filter layers, however, it is exposed in the present embodiment.

The optical filter 2 and the image sensor 12 described above are used as a high-order light cut filter and a photodetector in, for example, a diffraction grating type spectroscopic device Next, a method for manufacturing the optical filter 2 described above will be described. In the present embodiment, the optical filter 2 is manufactured according to a lift-off method.

First, the translucent substrate 4 shown in FIG. 4 is prepared. Next, the light transmitting region 41a and the edge part 4c of the translucent substrate 4 are masked by a photoresist, and then the first optical filter layer 6 is formed by vacuum deposition, sputtering, or CVD, etc., so as to cover the entire surface on the photodetecting part 4a side of the translucent substrate 4. Next, by removing the mask of the photoresist by a solvent of acetone, etc., the first optical filter layer 6 covering the mask of the photoresist is lifted off. The first optical filter layer 6 is thus laminated on the translucent substrate 4 so as to cover only the first filter region 42a, the second filter region 43a and the frame part 4b.

Next, the light transmitting region 41a, the first optical filter layer 6 laminated on the first filter region 42a, and the edge part 4c are masked by the photoresist, and then the second optical filter layer 8 is formed so as to cover the entire surface on the photodetecting part 4a side of the translucent substrate 4. Next, by removing the mask of the photoresist, the second optical filter layer 8 covering the mask of the photoresist is lifted off. Accordingly, the second optical filter layer 8 is laminated on the first optical filter layer 6 so as to cover only the second filter region 43a and the frame part 4b.

The optical filter 2 of the present embodiment is thus completed.

In the above-described embodiment, the first optical filter layer 6 and the translucent substrate 4 closely adhere to each other not only on the first filter region 42a but also on the frame part 4b and the second filter region 43a, so that the area of the portion where the first optical filter layer 6 and the translucent substrate 4 closely adhere to each other becomes larger than conventionally. Further, the first optical filter layer 6 is covered by the second optical filter layer 8 from above on the frame part 4b and the second filter region 43a. As a result, the first optical filter layer 6 is fixed to the translucent substrate 4 more firmly than conventionally, so that the first optical filter layer 6 can be restrained from peeling off from the translucent substrate 4 due to an external force and aging degradation.

In the above-described embodiment, the second optical filter layer 8 and the first optical filter layer 6 closely adhere to each other not only on the second filter region 43a but also on the frame part 4b. As a result, the second optical filter layer 8 is fixed to the first optical filter layer 6 more firmly than conventionally, so that the second optical filter layer 8 can be restrained from peeling off from the first optical filter layer 6 due to an external force and aging degradation.

Figure 7:
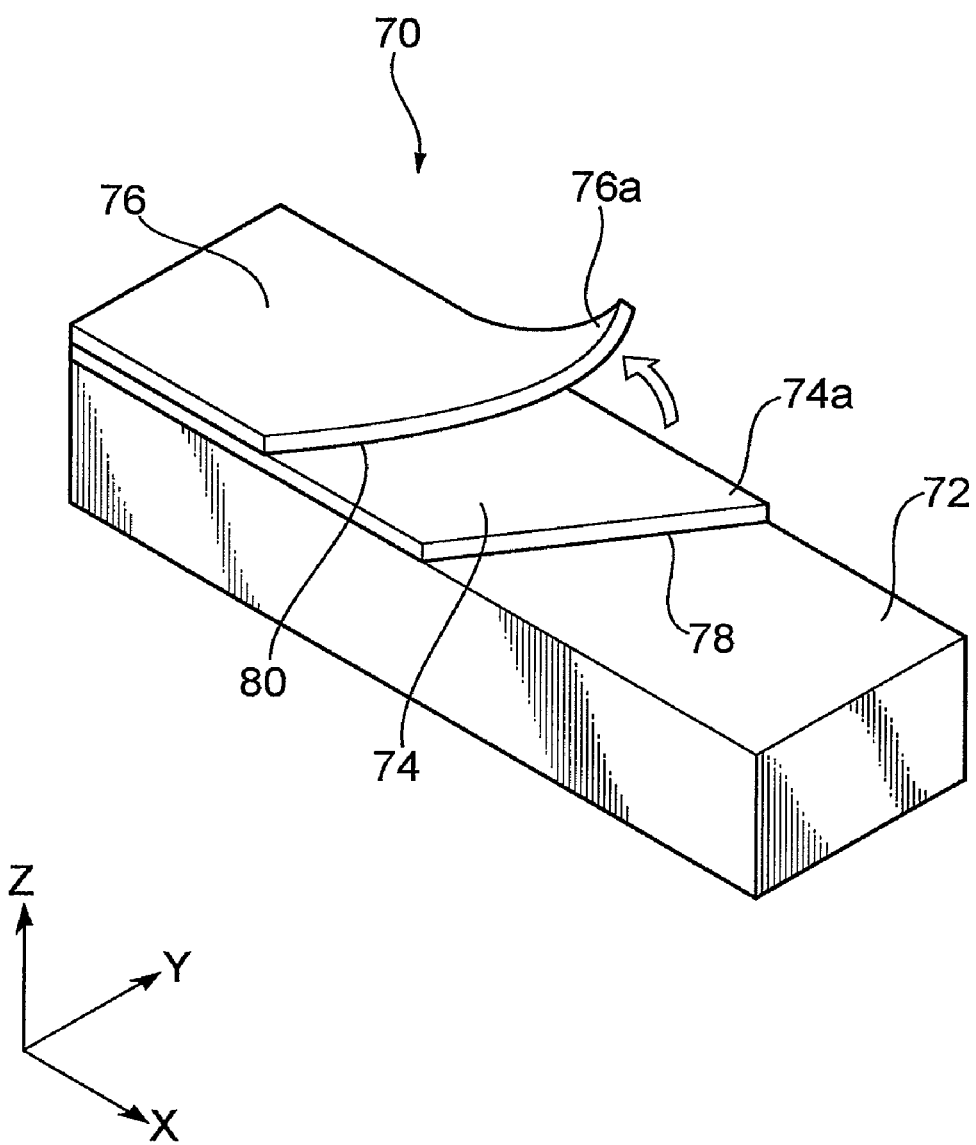
FIG. 7 is a schematic perspective view of a lamination type optical filter which does not have a frame part.

Further, in the optical filter 2 of the present embodiment, the first optical filter layer 6 and the second optical filter layer 8 are also laminated in order on the frame part 4b surrounding the photodetecting part 4a, so that in contrast to the lamination type optical filter 70 shown in FIG. 7, the end portion of the first optical filter layer 6 exposed inside the photodetecting part 4a and the end portion of the second optical filter layer 8 exposed inside the photodetecting part 4a are not sharply pointed. As a result, even when the boundary 45 between the light transmitting region 41a and the first filter region 42a and the boundary 46 between the first filter region 42a and the second filter region 43a are made to diagonally cross the alignment direction X of the plurality of sensor pixels 12a, in comparison with the case of the lamination type optical filter 70 shown in FIG. 7, the end portion of the first optical filter layer 6 and the end portion of the second optical filter layer 8 hardly peel off.

Further, in the above-described embodiment, even when an external force is applied to the optical filter 2, the photodetecting part 4a and the frame part 4b can be protected from the external force by the edge part 4c. By exposing the edge part 4c which is comparatively easily chipped on the translucent substrate 4 without laminating the optical filter layers thereon, the possibility that chipping occurring at the edge part 4c causes the optical filter layers to peel off is reduced.

Further, in the above-described embodiment, the boundary 45 between the light transmitting region 41a and the first filter region 42a and the boundary 46 between the first filter region 42a and the second filter region 43a are made to diagonally cross the alignment direction X of the plurality of sensor pixels 12a, so that the boundaries 45 and 46 cross immediately above two or more sensor pixels. As a result, even when the light transmittance decreases at the boundaries 45 and 46 of the filter regions 42a and 43a of the optical filter 2, a decrease in output per sensor pixel can be reduced in comparison with the case where the boundary 45 and 46 crosses immediately above a single sensor pixel 12a.

In the above-described embodiment, no adhesive is interposed at the boundary between the light transmitting region 41a and the first filter region 42a and the boundary between the first filter region 42a and the second filter region 43a. As a result, in comparison with the case where an adhesive is interposed at these boundaries, the light transmittance at the boundary between the light transmitting region 41a and the first filter region 42a is improved, and outputs (detected intensities of light) of the sensor pixels 12a positioned immediately below the boundary between the light transmitting region 41a and the first filter region 42a are also improved. Similarly, the light transmittance at the boundary between the first filter region 42a and the second filter region 43a is also improved, and the outputs (detected intensities of light) of the sensor pixels 12a immediately below the boundary between the first filter region 42a and the second filter region 43a are also improved.

Further, the optical filter 2 of the present embodiment has a multistage structure formed by laminating the translucent substrate 4, the first optical filter layer 6, and the second optical filter layer 8, so that in comparison with the case where the filter regions are formed by forming a plurality of optical filter layers adjacent to each other on the translucent substrate, edges of the light transmitting region 41a, the first filter region 42a, and the second filter region 43a become sharper. This is because, due to the multistage structure, when the first optical filter layer 6 and the second optical filter layer 8 are formed, the influence of sags of the edges of the optical filter layers becomes smaller, and the sharpness of the edges are hardly influenced by the accuracy of alignment of the light transmitting region 41a, the first filter region 42a, and the second filter region 43a.

A preferred embodiment of the present invention is described in detail above, however, the present invention is not limited to the above-described embodiment.

For example, in the above-described embodiment, the optical filter 2 is manufactured according to a lift-off method, however, the optical filter 2 may be manufactured by forming the first optical filter layer 6 and the second optical filter layer 8 in order by a known etching method.

The above-described optical filter 2 may not include the edge part 4c. Even in this case, the optical filter layers can be restrained from peeling off substantially similar to those in the above-described embodiment.

Figure 5:
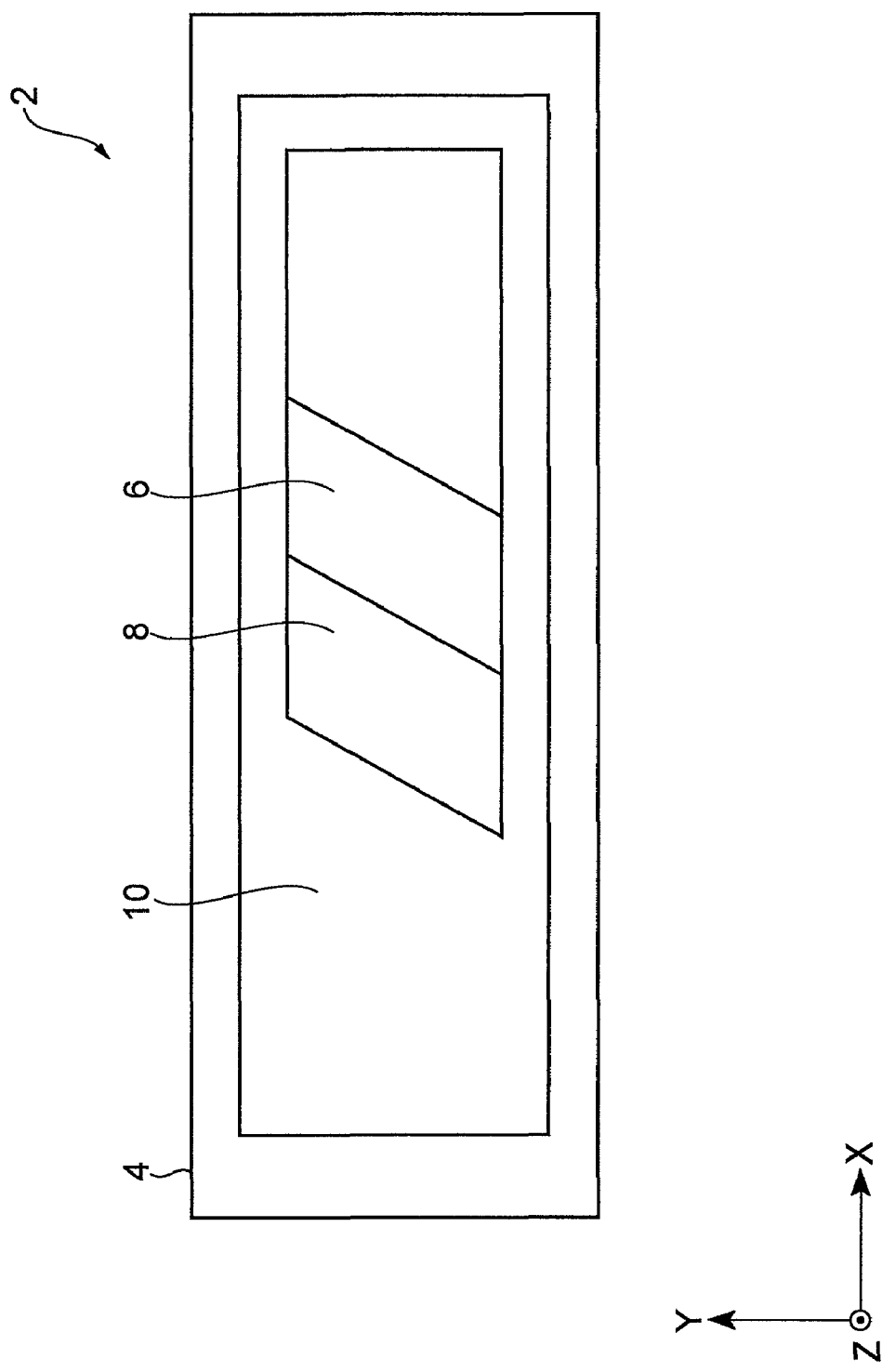
FIG. 5 is a schematic view of an optical filter of another embodiment of the present invention, as viewed from the photodetecting part side.
Figure 6:
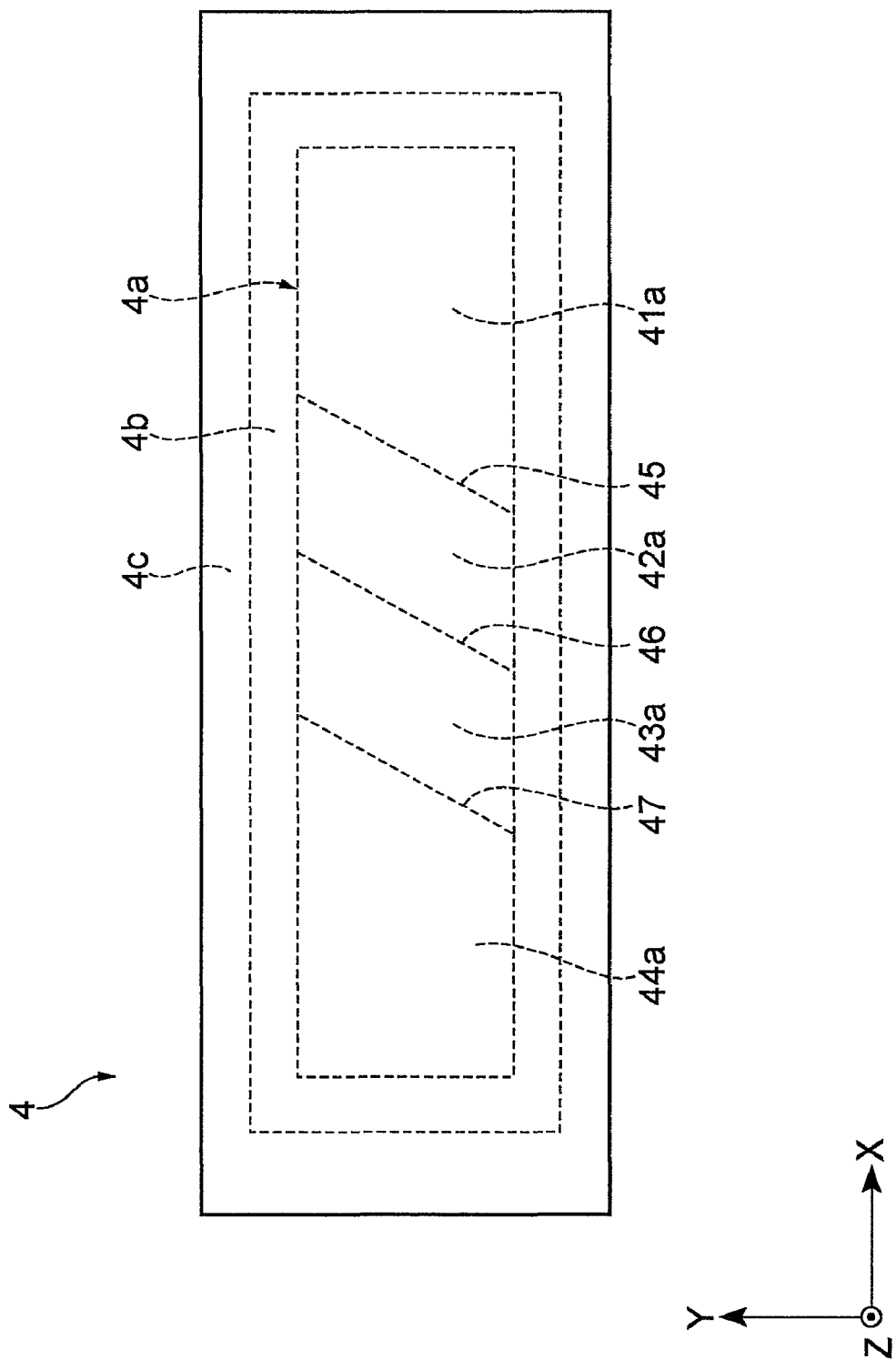
FIG. 6 is a schematic view of a translucent substrate of the optical filter of another embodiment of the present invention, as viewed from the photodetecting part side.

As shown in FIG. 5 and FIG. 6, it is also allowed that the optical filter 2 of the above-described embodiment further includes a third optical filter layer 10 to be laminated on the second optical filter 8, the photodetecting part 4a further includes a third filter region 44a which is adjacent to the second filter region 43a in the longitudinal direction of the photodetecting part 4a, and positioned on the side opposite to the first filter region 42a across the second filter region 43a. In this case, the first optical filter layer 6 is laminated so as to cover the first filter region 42a, the second filter region 43a, the third filter region 44a, and the frame part 4b. The second optical filter layer 8 is laminated so as to cover the second filter region 43a, the third filter region 44a, and the frame part 4b. The third optical filter layer 10 is laminated so as to cover the third filter region 44a and the frame part 4b. The third optical filter layer 10 is a dielectric multilayer film having wavelength transmission characteristics different from those of the first optical filter layer 6 and the second optical filter layer 8. The areas of the light transmitting region 41a, the first filter region 42a, the second filter region 43a, and the third filter region 44a are substantially equal to each other.

By further including the above-described third optical filter layer 10 and third filter region 44a, the optical filter 2 can block light in a wavelength band which cannot be completely blocked by the first optical filter layer 6 and the second optical filter layer 8.

Even in the case where the optical filter 2 includes the above-described third optical filter 10, as in the case of the above-described embodiment, the first optical filter layer 6 and the second optical filter layer 8 can be restrained from peeling off. Further, the third optical filter layer 10 and the second optical filter layer 8 closely adhere to each other not only on the third filter region 44a but also on the frame part 4b, so that the third optical filter layer 10 is firmly fixed to the second optical filter layer 8, and the third optical filter layer 10 can be restrained from peeling off from the second optical filter layer 8 due to an external force and aging degradation.

In the optical filter 2, the third optical filter layer 10 is also laminated on the frame part 4b surrounding the photodetecting part 4a, so that in contrast to the lamination type optical filter 70 shown in FIG. 7, the end portion of the third optical filter layer 10 exposed inside the photodetecting part 4a is not sharply pointed. As a result, even when the boundary 47 between the second filter region 43a and the third filter region 44a is made to diagonally cross the alignment direction X of the plurality of sensor pixels 12a, the end portion of the third optical filter layer 10 hardly peels off in comparison with the case of the lamination type optical filter 70 shown in FIG. 7.

No adhesive is interposed at the boundary between the second filter region 43a and the third filter region 44a, so that in comparison with the case where an adhesive is interposed at the boundary, the light transmittance at the boundary between the second filter region 43a and the third filter region 44a is improved. Therefore, outputs of the sensor pixels 12a immediately below the boundary between the second filter region 43a and the third filter region 44a are also improved.

When the optical filter 2 further includes a third optical filter layer 10, preferably, the boundary 47 between the second filter region 43a and the third filter region 44a diagonally crosses the alignment direction X of the plurality of sensor pixels 12a immediately above the image sensor 12. The boundaries 45, 46, and 47 are normally parallel to each other.

When the boundary 47 between the second filter region 43a and the third filter region 44a is made to diagonally cross the alignment direction X of the plurality of sensor pixels 12a, the boundary 47 crosses immediately above two or more sensor pixels 12a. As a result, even when the light transmittance decreases at the boundary 47 between the second filter region 43a and the third filter region 44a of the optical filter 2, a decrease in output per sensor pixel can be reduced in comparison with the case where the boundary 47 crosses immediately above a single sensor pixel 12a.

The optical filter 2 described above may include a plurality of optical filter layers in addition to the first optical filter layer 6, the second optical filter layer 8, and the third optical filter layer 10, and the photodetecting part 4a of the translucent substrate 4 may include a plurality of filter regions in addition to the first filter region 42a, the second filter region 43a, and the third filter region 44a. In this case, on the assumption that n (n: integer not less than 3) optical filter layers are laminated in order in the optical filter 2, and the photodetecting part 4a of the translucent substrate 4 includes n filter regions aligned in order from the light transmitting region 41a positioned on one side in the longitudinal direction of the photodetecting part 4a toward the opposite side in the longitudinal direction, the structure of the optical filter 2 can be generalized as follows. That is, in the optical filter 2, the first optical filter layer is laminated on the translucent substrate 4a so as to cover the first to n-th filter regions and the frame part 4b. The (i-1)-th optical filter layer (i: an arbitrary integer not less than 3 and not more than n) is laminated on the (i-2)-th optical filter layer so as to cover the (i-1)-th to n-th filter regions and the frame part 4b. The i-th optical filter layer is laminated on the (i-1)-th optical filter layer so as to cover the i-th to n-th filter regions and the frame part 4b. Even in this case, the optical filter layers can be restrained from peeling off as in the case of the above-described embodiment.

Further, in the embodiment described above, the optical filter layers are formed on the surface opposite to the image sensor of the translucent substrate, however, the optical filter layers may be formed on the surface on the same side as the image sensor of the translucent substrate.

The invention claimed is:

1. An optical filter disposed on an image sensor including a plurality of sensor pixels aligned, comprising:
    an elongated translucent substrate;
    a first optical filter layer laminated on the translucent substrate; and
    a second optical filter layer laminated on the first optical filter layer, wherein
    the translucent substrate includes: a photodetecting part which is long in the alignment direction of the plurality of sensor pixels and positioned immediately above the image sensor; and a frame part surrounding the photodetecting part,
    the photodetecting part includes:
    a light transmitting region positioned on one side in the longitudinal direction of the photodetecting part;
    a first filter region adjacent to the light transmitting region in the longitudinal direction of the photodetecting part; and
    a second filter region which is adjacent to the first filter region in the longitudinal direction of the photodetecting part and positioned on the side opposite to the light transmitting region across the first filter region,
    the first optical filter layer is laminated so as to cover the first filter region, the second filter region, and the frame part, and
    the second optical filter layer is laminated so as to cover the second filter region and the frame part.

2. The optical filter according to claim 1, further comprising:
    a third optical filter layer laminated on the second optical filter layer, wherein
    the photodetecting part further includes a third filter region which is adjacent to the second filter region in the longitudinal direction of the photodetecting part and positioned on the side opposite to the first filter region across the second filter region,
    the first optical filter layer is laminated so as to cover the first filter region, the second filter region, the third filter region, and the frame part,
    the second optical filter layer is laminated so as to cover the second filter region, the third filter region, and the frame part, and
    the third optical filter layer is laminated so as to cover the third filter region and the frame part.

3. The optical filter according to claim 1, wherein the translucent substrate further includes an edge part surrounding the frame part.

4. The optical filter according to claim 1, wherein the boundary between the light transmitting region and the first filter region and the boundary between the first filter region and the second filter region diagonally cross in the alignment direction of the plurality of sensor pixels immediately above the image sensor.

5. The optical filter according to claim 2, where in the boundary between the second filter region and the third filter region diagonally crosses in the alignment direction of the plurality of sensor pixels immediately above the image sensor.

6. The optical filter according to claim 1, wherein the translucent substrate is exposed in the light transmitting region.

7. The optical filter according to claim 3, wherein the edge part is exposed.

* * * * *